(12) United States Patent
Sites et al.

(10) Patent No.: US 8,634,068 B2
(45) Date of Patent: Jan. 21, 2014

(54) METHOD OF DETERMINING THE OPTIMAL WAVELENGTH FOR INSPECTING OPHTHALMIC LENSES

(75) Inventors: Peter W. Sites, Orange Park, FL (US); Russell J. Edwards, Jacksonville, FL (US); Kenneth L. Cagle, Saint Marys, GA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 22 days.

(21) Appl. No.: 13/489,486

(22) Filed: Jun. 6, 2012

(65) Prior Publication Data

US 2012/0320366 A1 Dec. 20, 2012

Related U.S. Application Data

(60) Provisional application No. 61/497,825, filed on Jun. 16, 2011.

(51) Int. Cl.
*G01B 9/00* (2006.01)
(52) U.S. Cl.
USPC .................. 356/124; 356/239.1; 264/1.38
(58) Field of Classification Search
USPC ............ 356/124–127, 239.1, 239.8; 264/1.38
See application file for complete search history.

(56) References Cited

U.S. PATENT DOCUMENTS

| 5,443,152 | A | 8/1995 | Davis |
| 5,482,901 | A * | 1/1996 | Morgan et al. .................. 501/13 |
| 5,500,732 | A | 3/1996 | Ebel |
| 5,528,357 | A | 6/1996 | Davis |
| 5,568,715 | A | 10/1996 | Ebel |
| 5,578,331 | A | 11/1996 | Martin |
| 5,640,464 | A | 6/1997 | Ebel |
| 5,649,410 | A | 7/1997 | Martin |
| 5,675,962 | A | 10/1997 | Martin |
| 5,687,541 | A | 11/1997 | Martin |
| 5,745,230 | A | 4/1998 | Edwards |
| 5,748,300 | A | 5/1998 | Wilder |
| 5,805,276 | A | 9/1998 | Davis |
| 5,812,254 | A | 9/1998 | Ebel |
| 5,828,446 | A | 10/1998 | Davis |
| 5,943,436 | A | 8/1999 | Ebel |
| 5,995,213 | A | 11/1999 | Davis |
| 6,154,274 | A | 11/2000 | Davis |
| 6,246,062 | B1 | 6/2001 | Ross, III |
| 6,577,387 | B2 | 6/2003 | Ross, III |
| 6,882,411 | B2 | 4/2005 | Dispenza |
| 2002/0122172 | A1 | 9/2002 | Ross |
| 2006/0275596 | A1 | 12/2006 | Payne |
| 2012/0187590 | A1 * | 7/2012 | Widman et al. ............... 264/1.38 |

OTHER PUBLICATIONS

PCT International Search Report, dated Oct. 5, 2012, for PCT Int'l Appln. No. PCT/US2012/042277.

* cited by examiner

*Primary Examiner* — Gregory J Toatley
*Assistant Examiner* — Iyabo S Alli

(57) ABSTRACT

Methods for inspecting ophthalmic lenses with different wavelengths of radiation are disclosed herein.

8 Claims, 3 Drawing Sheets

Contrast vs Wavelength

METHOD OF DETERMINING THE OPTIMAL WAVELENGTH FOR INSPECTING OPHTHALMIC LENSES

CROSS-REFERENCE TO RELATED APPLICATION

This application claims the benefit of U.S. Provisional Patent Application Ser. No. 61/497,825 filed Jun. 16, 2011.

FIELD OF THE INVENTION

This invention relates to the inspection of ophthalmic lenses, particularly hydrogel contact lenses for missing material defects.

BACKGROUND OF THE INVENTION

Ophthalmic lenses, such as hydrogel contact lenses are formed, inspected, and packaged on manufacturing lines with minimal human intervention. During these processes, certain defects to those lenses occur and one common defect is missing material in a formed lens. Whether such missing material is the entire thickness of a contact lens, or just a portion of its thickness, lenses with such defects should be removed from the product that ultimately reaches end users.

There are inspection methods, which find holes in ophthalmic lenses. However, given the variety of different types of contact lens materials that are on the market, lens makers often must inspect such lenses using radiation of different wavelengths. This is particularly true if one is looking for a missing material defect which is not a complete hole, such as a depression in the lens material. Typically the process of finding radiation of an optimal wavelength is a trial and error process. This trial and error method wastes a great deal of time and materials, and does not guarantee an optimal wavelength selection. Therefore, it is desirable to determine the optimal wavelength of radiation for the inspection of such missing material defects without a trial and error process. This desire is met by the foregoing invention.

DETAILED DESCRIPTION OF THE INVENTION

Figure 1:
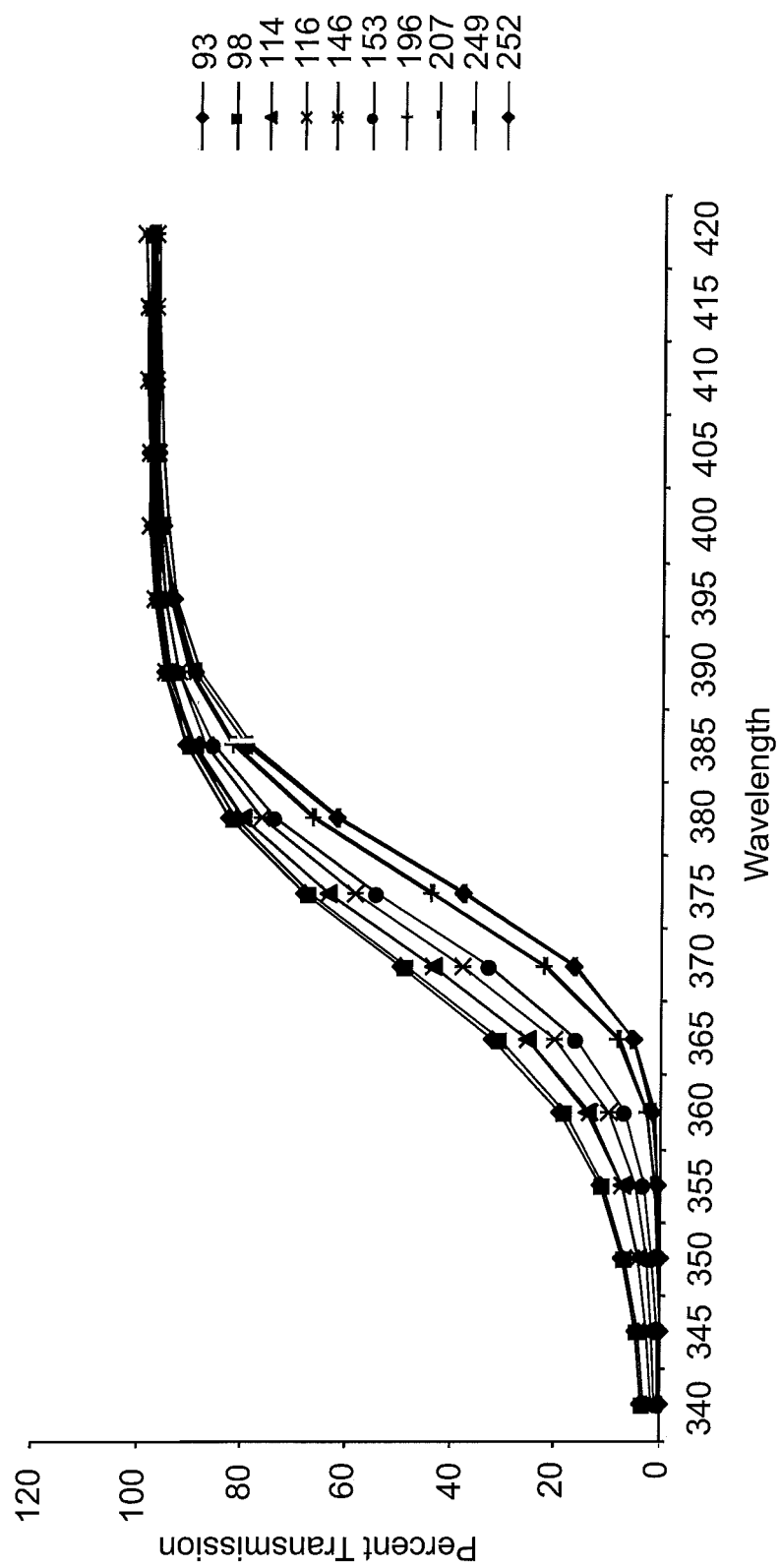
FIG. 1 Plot of % transmission over several thickness at several wavelengths.

This invention provides a method of determining the wavelength of radiation which may be used to automatically inspect an ophthalmic lens of a maximum thickness for missing material of an amount between about zero and about a certain thickness, comprising
(a) measuring the % transmittance of radiation of several different wavelengths through ophthalmic lenses of several different known thicknesses;
(b) calculating the k value for each wavelength of the several different wavelengths and confirming that transmission of light through the ophthalmic lenses follows Beers' Law
(c) subtracting the % transmittance at said certain thickness from the % transmittance in the absence of an ophthalmic lens at said several different wavelengths to give first contrast values
(d) subtracting the % transmittance at said maximum thickness from the % transmittance at said certain lens thickness at said several different wavelengths to give second contrast values
(e) comparing the first contrast values with the second contrast values at each wavelength and selecting the lowest contrast values at each wavelength and the plotting such lowest contrast values against wavelength
(f) selecting the wavelength from the plot of step (e) at the highest peak for inspection of missing material defects.

As used herein the term "ophthalmic lens" refers to soft contact lenses, such as hydrogels which are made from monomers, macromers or prepolymers. Examples of such ophthalmic lenses include but are not limited to lenses made from the following generic formulations acofilcon A, alofilcon A, alphafilcon A, amifilcon A, astifilcon A, atalafilcon A, balafilcon A, bisfilcon A, bufilcon A, comfilcon, crofilcon A, cyclofilcon A, darfilcon A, deltafilcon A, deltafilcon B, dimefilcon A, drooxifilcon A, epsifilcon A, esterifilcon A, etafilcon A, focofilcon A, genfilcon A, govafilcon A, hefilcon A, hefilcon B, hefilcon D, hilafilcon A, hilafilcon B, hioxifilcon B, hioxifilcon C, hixoifilcon A, hydrofilcon A, lenefilcon A, licryfilcon A, licryfilcon B, lidofilcon A, lidofilcon B, lotrafilcon A, lotrafilcon B, mafilcon A, mesifilcon A, methafilcon B, mipafilcon A, narafilcon A, nelfilcon A, netrafilcon A, ocufilcon A, ocufilcon B, ocufilcon C, ocufilcon D, ocufilcon E, ofilcon A, omafilcon A, oxyfilcon A, pentafilcon A, perfilcon A, pevafilcon A, phemfilcon A, polymacon, silafilcon A, siloxyfilcon A, tefilcon A, tetrafilcon A, trifilcon A, and xylofilcon A. More particularly preferred ophthalmic lenses of the invention are genfilcon A, lenefilcon A, comfilcon, lotrafilcon A, lotraifilcon B, and balafilcon A. The most preferred lenses include etafilcon A, nelfilcon A, hilafilcon, polymacon, comfilcon, galyfilcon, senofilcon, and narafilcon.

The term thickness refers to the measurement of the ophthalmic lens from its front surface to its opposing back surface. A typical hydrogel contact lens has a thickness of about 60 μm to about 600 μm. For purposes of this invention, the thickness of the finished product is the "maximum thickness". In the methods of the invention radiation is transmitted through hydrogel contact lenses having a thickness of from about 200 μm to about 600 μm, preferably about 85 μm to about 209 μm.

The term "certain thickness" refers to the depth of a missing material defect which does not go through the entire maximum thickness of the ophthalmic lens. For example for an ophthalmic lens having a maximum thickness of about 350 μm, a certain thickness is any number from about 300 μm to about 50 μm. Preferably certain thickness is selected from the group consisting of 30 μm, 40 μm, 50 μm, and 60 μm.

As used herein, the term "% transmittance" means the amount of radiation which reaches a spectrometer after its transmission through either a cuvette, an ophthalmic lens and a solution, or a cuvette and solution. In either case the non-limiting examples of solutions are deionized water and saline solution, preferably saline solution.

In the method, the transmitted radiation may have wavelengths in the visible, ultraviolet, or infrared radiation. Visible radiation has wavelengths from about 390 nm to about 700 nm, ultraviolet radiation has wavelengths from about 10 nm to about 390 nm, and infrared radiation has wavelengths from about 700 nm to about 3000 nm. It is preferred that radiation in the range of about 340 nm to about 550 nm is transmitted through the ophthalmic lenses.

As used herein the term "contrast value" means the difference in transmission between the two different thickness of lens material.

As used herein the "k" value is the constant found in the theoretical relationship known as Beer's Law. Beer's Law relates the percent of transmission of radiation through a material ("%T") to the thickness of the material ("t") and a constant ("k") (% T=$10^{(2-kt)}$) Each wavelength has a particular k which may be calculated by known methods, such as regression fitting.

The wavelengths found by this method may be used in a number of inspection techniques. Non-limiting examples of such techniques are disclosed in the following patents U.S. Pat. Nos. 6,882,411; 6,577,387, 6,246,062; 6,154,274; 5,995,213; 5,943,436; 5,828,446; 5,812,254; 5,805,276; 5,748,300; 5,745,230; 5,687,541; 5,675,962; 5,649,410; 5,640,464; 5,578,331; 5,568,715; 5,443,152; 5,528,357; and 5,500,732; all of which are incorporated herein in their entireties by reference.

EXAMPLE

Figure 2:
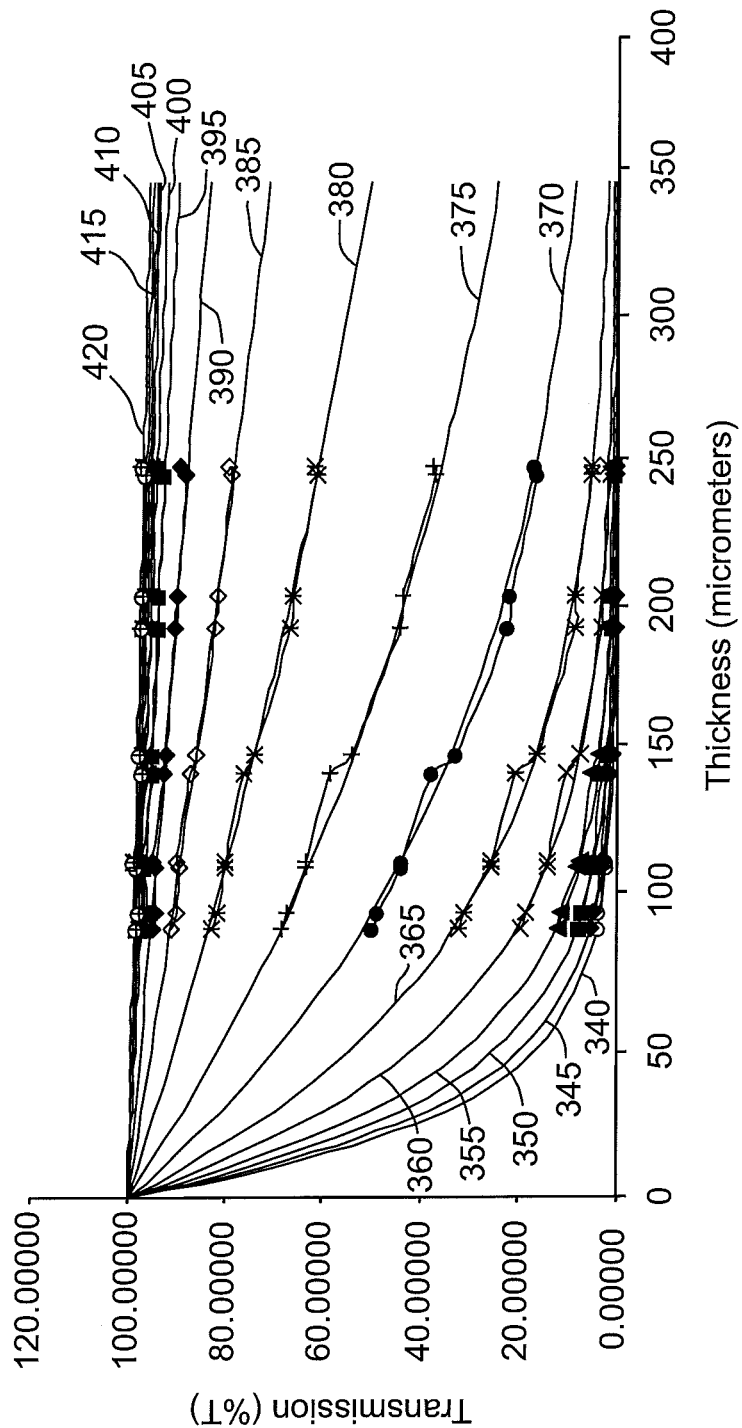
FIG. 2 Plot of theoretical Beer's Law calculation over the experimental data of FIG. 1.

Ten etafilcon A hydrogel lenses having center thicknesses from 93 μm to 252 μm were prepared. Each sample was placed in a cuvette having internal dimensions of 18.5 mm wide×5.1 mm wide×21.2 high (without a cap) which holds approximately 1650 mL of liquid with a cap. Light of wavelengths from 340 nm to 420 nm was shown through the lens/cuvette/saline solution and the percent transmission was obtained using a Perkin Elmer UV/VIS Lambda 18 spectrometer. The percent transmission versus wavelength for every lens thickness is plotted in FIG. 1. FIG. 2 overlays the theoretical calculation over the experimental data of FIG. 1 and illustrates that this material behaves in accordance with Beer's Law.

Figure 3:
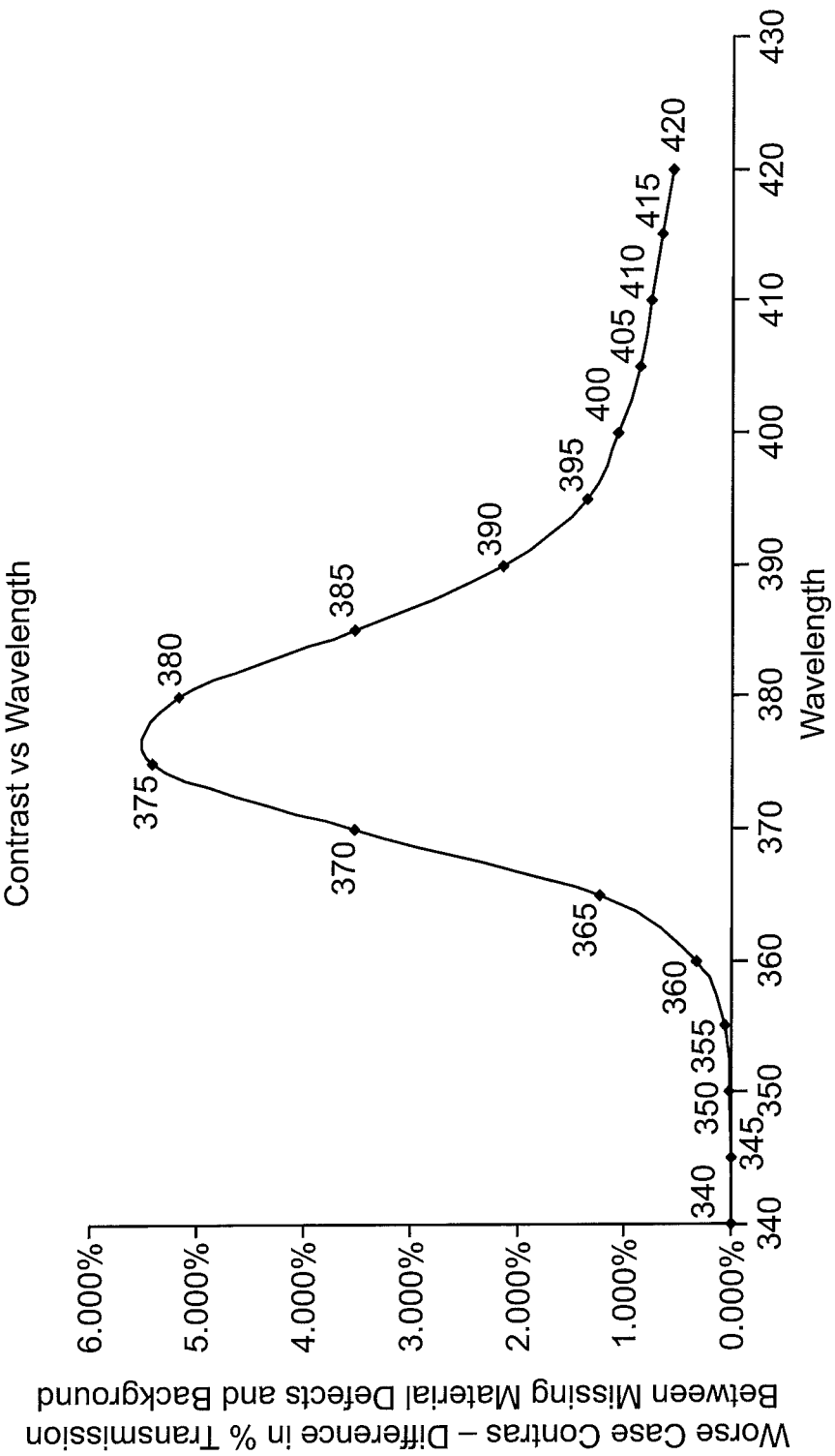
FIG. 3 Plot of Contrast over several wavelengths.

For each wavelength the % transmittance for a cuvette/saline solution/lens having a thickness of 50 μm was subtracted from % transmittance for a cuvette/saline solution to give a first contrast value. For each wavelength the % transmittance for a cuvette/saline solution/lens having a thickness of 350 μm was subtracted from % transmittance for a cuvette/saline solution//lens having a thickness of 300 μm to give a second contrast value. The first and the second contrast values were compared at each wavelength and the lower of the two values was plotted against wavelength in FIG. 3. This figure shows that the highest peak occurs at around 375 nm, therefore, the best wavelength to determine a missing material defect of about 50 μm is 375 nm.

We claim:

1. A method of determining the wavelength of radiation which may be used to automatically inspect an ophthalmic lens of a maximum thickness for missing material of an amount between about zero and about a certain thickness, comprising:
    (a) measuring a % transmittance of radiation of several different wavelengths through multiple ophthalmic lenses of several different known thicknesses;
    (b) calculating the k value for each wavelength of the several different wavelengths and confirming that transmission of light through the multiple ophthalmic lenses follows Beers' Law;
    (c) subtracting the % transmittance at said known thickness from the % transmittance in the absence of an ophthalmic lens at said several different wavelengths to generate first contrast values;
    (d) subtracting the % transmittance at said maximum thickness from the % transmittance at said known lens thickness at said several different wavelengths to give second contrast values;
    (e) comparing the first contrast values with the second contrast values at each wavelength and selecting lowest contrast values at each wavelength and the plotting such lowest contrast values against wavelength; and
    (f) selecting the wavelength from the plot of step (e) at a highest peak for inspection of missing material defects.

2. The method of claim 1 wherein the maximum thickness is about 250 μm to about 400 μm.

3. The method of claim 1 wherein the maximum thickness is about 200 μm and about 600 μm.

4. The method of claim 1 wherein said certain thickness is a number from about 20 μm to about 100 μm.

5. The method of claim 1 wherein said certain thickness is a number selected from the group consisting of 30 μm, 40 μm, 50 μm, and 60 μm.

6. The method of claim 1 wherein said radiation of several different wavelengths are from about 340 nM to about 430 nM.

7. The method of claim 1 wherein said radiation of several different wavelengths are from about about 340 nm to about 550 nm.

8. The method of claim 1 wherein said ophthalmic lenses are selected from the group consisting of etafilcon A, nelfilcon A, hilafilcon, polymacon, comfilcon, galyfilcon , senofilcon , and narafilcon.

* * * * *